(12) United States Patent
Saito et al.

(10) Patent No.: US 7,570,440 B2
(45) Date of Patent: Aug. 4, 2009

(54) OPTICAL HEAD AND AN OPTICAL RECORD PLAYBACK EQUIPMENT

(75) Inventors: Yoshio Saito, Tokyo (JP); Shuhei Miyazaki, Tokyo (JP)

(73) Assignee: TDK Corporation, Tokyo (JP)

( * ) Notice: Subject to any disclaimer, the term of this patent is extended or adjusted under 35 U.S.C. 154(b) by 62 days.

(21) Appl. No.: 11/681,447

(22) Filed: Mar. 2, 2007

(65) Prior Publication Data

US 2007/0220536 A1 Sep. 20, 2007

(30) Foreign Application Priority Data

Mar. 10, 2006 (JP) ............... 2006-064992

(51) Int. Cl.
*G02B 7/02* (2006.01)
*G02B 7/00* (2006.01)
(52) U.S. Cl. .................. 359/813; 359/824; 369/44.23
(58) Field of Classification Search ................. 359/813, 359/814, 822, 824; 369/44.14–44.18, 44.23, 369/44.24
See application file for complete search history.

(56) References Cited

U.S. PATENT DOCUMENTS 5,113,387 A * 5/1992 Goldsmith et al. ....... 369/44.38
5,432,772 A * 7/1995 Yamamoto ............... 720/680
5,511,049 A * 4/1996 Goda ...................... 369/44.15

FOREIGN PATENT DOCUMENTS

| JP | 09-204743 | 8/1997 |
| JP | 2004-348794 | 12/2004 |
| JP | 2005-025920 | 1/2005 |
| JP | 2005-285166 | 10/2005 |

* cited by examiner

*Primary Examiner*—Mohammed Hasan
(74) *Attorney, Agent, or Firm*—Oblon, Spivak, McClelland, Maier & Neustadt, P.C.

(57) ABSTRACT

An optical head including a housing that supports an objective lens driving device, which drives an objective lens. A main-shaft and sub-shaft support the housing such that the housing slides along a radial direction of an optical recording medium along the main-shaft and the sub-shaft. A main-bearing is formed on the housing that supports the main-shaft so that the main-shaft can slide free through the main-bearing. A sub-bearing is formed on the housing and supports the sub-shaft so that the sub-shaft can slide free through the sub-bearing. At least one slot is formed in the sub-bearing at a portion that contacts the sub-shaft.

12 Claims, 7 Drawing Sheets

FIG 6

| | before | after | wear UNIT [mm] |
|---|---|---|---|
| EX. 1 | 1.102 | 1.079 | 0.023 |
| EX. 2 | 1.099 | 1.068 | 0.031 |
| EX. 3 | 1.101 | 1.064 | 0.037 |
| COEX. 1 | 1.098 | 0.807 | 0.291 |
| COEX. 2 | 1.100 | 0.904 | 0.196 |
| COEX. 3 | 1.106 | 0.771 | 0.335 |

OPTICAL HEAD AND AN OPTICAL RECORD PLAYBACK EQUIPMENT

BACKGROUND OF THE INVENTION

1. Field of the Invention

The present invention relates to the optical record playback equipment which equipped optical recording media, such as an optical disc, with the optical head which performs record or playback of data, and this optical head.

2. Description of the Related Art

An optical head irradiates an optical disc used as the predetermined diameter of spot. An objective lens receives the reflective light. Moreover, it becomes an objective lens drive which drives an objective lens in the direction of tracking, and the direction of a focus from two or more optical elements. The optical system, and an objective lens drive unit and an optical system are carried, and housings in which a slide is possible are consisted of by the radial direction of the optical disc.

Among the components of an optical head explained above, housing is formed with various metal, such as zinc (Zn), aluminum (aluminum), and magnesium (Mg), or these alloys, in order to secure desired rigidity (for example, refer to Japanese Patent No. 2005-285166).

Hereafter, this art is called the 1st conventional example.

It is necessary to carry out straight line movement in a parallel field to the data recording side of an optical disc radially, always maintaining correctly the distance of the data recording side of an optical disc, and an objective lens, when carrying out the slide of the optical head of the above-mentioned composition. Therefore, two main-bearings which have a circle-shaped section mostly set a prescribed interval in the one side surface of housing, and are provided in it. In this housing, the sub-bearing which has an about U character-shaped section is provided in the side of the opposite side which sandwiched the objective lens. And a cylinder-shaped main-shaft is inserted in a main-bearing, and a cylinder-shaped sub-shaft is inserted in a sub-bearing.

A common material of the above-mentioned main-shaft and sub-shaft is stainless steel, and, generally the Vickers hardness is 200 (equivalent to 4 of Mohs hardness) grades. On the other hand, zincky (Zn) Mohs hardness is 2.5, the Mohs hardness of aluminum (aluminum) is 2.9, the Mohs hardness of magnesium (Mg) is 2.0 and all are lower than stainless hardness.

Therefore, in an optical disc, when seek operation is repeated also millions times, the sub-bearing of housing may be worn out depending on the shape of the bearing of housing, the physical relationship of an axis, and accuracy of dimension. If a sub-bearing was worn out, in order that the whole optical head might incline, it did not converge correctly the light beam emitted from an objective lens on the data logging side of the optical disc, but there was a possibility that it might become impossible to perform record or playback of data to an optical disc.

So, while constituting housing and a sub-bearing on another object, there are some which allocated another member formed in the sliding portion with the sub-shaft of a sub-bearing with the resin material in the conventional optical head (for example, refer to Japanese Patent No. 2004-348794.).

Hereafter, this art is called the 2nd conventional example.

In the optical head which has the sub-bearing formed united with housing which consists of metal like the 1st above-mentioned conventional example whose hardness is lower than the metal which constitutes a sub-shaft, after wearing the sub-bearing out, the optical disc had a possibility that it might become impossible to perform record or playback of data.

While constituting housing and a sub-bearing on another object like the 2nd above-mentioned conventional example, when another member is allocated in a sliding portion with the sub-shaft of a sub-bearing, the number of parts increases. The process of attaching another member to a sub-bearing, and the process of attaching a sub-bearing to housing are required, and an optical head becomes expensive.

There is a possibility that the sub-bearing itself may separate from housing at the time of operation of an optical head.

Moreover, when it miniaturizes optical record playback equipment, there are various restrictions on a size, but this restriction cannot be filled with composition like the 2nd above-mentioned conventional example.

Therefore, the miniaturization of optical record playback equipment is unrealizable.

Therefore, in the optical head which has housing which consists of metal whose hardness is lower than the metal which constitutes a sub-shaft, it is requested that wear of a sub-bearing is lessened as much as possible, without providing the sub-bearing of housing and another object.

SUMMARY OF THE INVENTION

An object of this invention is to solve the above subjects.

This invention is constructed as described below in order to solve the aforementioned problems.

Optical head having the structure where housing which supports the objective lens driving device which drives an objective lens slides along the radial direction of an optical recording medium with a main-shaft and a sub-shaft, said optical head comprising;

said housing is provided with the main-bearing supported so that said main-shaft can slide free, and the sub-bearing supported so that said sub-shaft can slide free, in said sub-bearing, slot is formed in the portion which touches said sub-shaft.

Moreover, in the optical head of the present invention, said slot is formed along a direction almost perpendicular to said sub-shaft.

Furthermore, in the optical head of the present invention, said housing consists of metal and said main-bearing and said sub-bearing are formed united with a main part.

Furthermore, in the optical head of the present invention, said metal is magnesium or a magnesium alloy.

Furthermore, optical record playback equipment in this invention is characterized by having the optical head of the present invention.

In the optical head of this invention, even if it repeats seek operation, the amount of wear of a sub-bearing is sharply reducible compared with the former.

Since housing and a sub-bearing are formed in one, on the occasion of the manufacture, the number and process number of parts are reducible.

Therefore, cheap optical record playback equipment with high endurance, can be obtained using this optical head.

BRIEF DESCRIPTION OF THE DRAWINGS

FIG. 6 is a figure showing an example of change of the thickness of the sub-bearing before and behind the sliding test of an example and a comparative example.

DETAILED DESCRIPTION OF THE PREFERRED EMBODIMENTS

Embodiment 1

Figure 1:
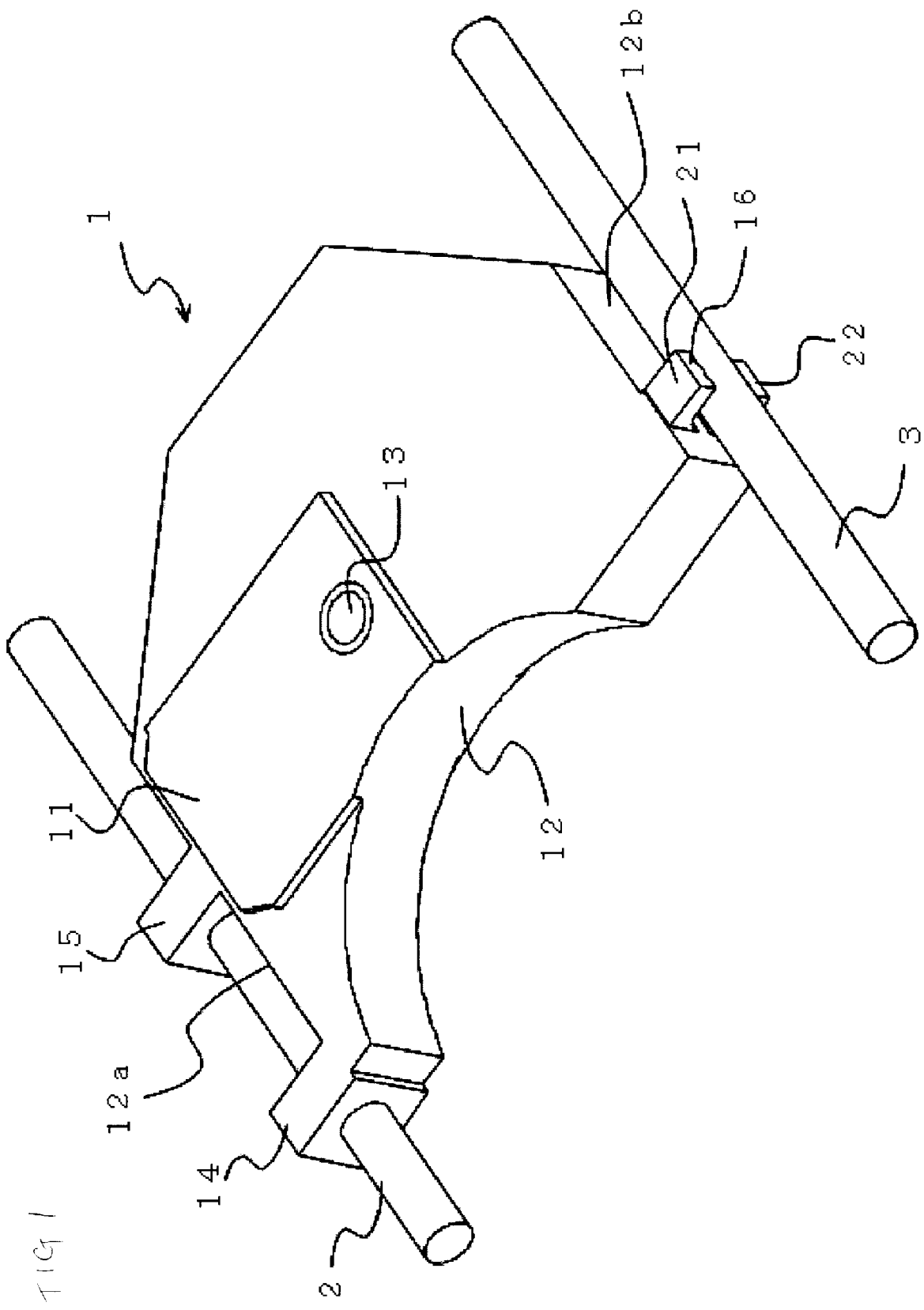
FIG. 1 is an outline perspective view showing the state where the main-shaft and the sub-shaft were inserted in the main-bearing and sub-bearing of an optical head concerning embodiment of the invention 1.
Figure 2:
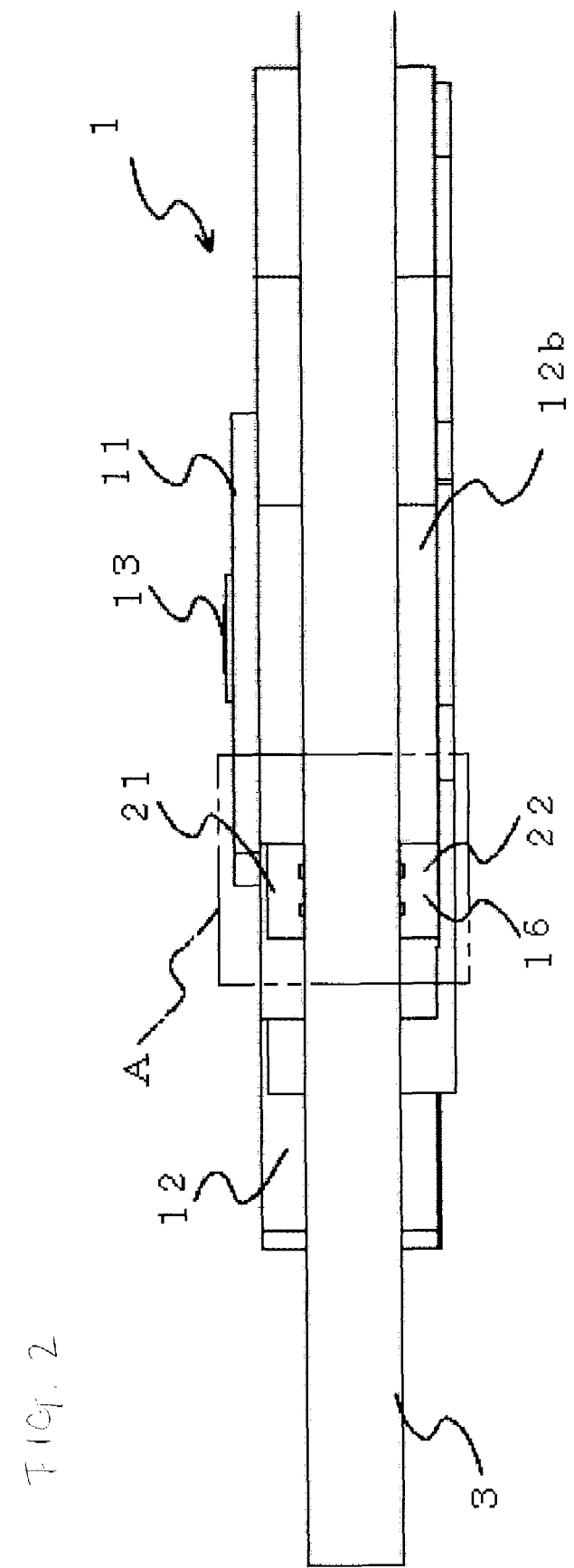
FIG. 2 is a right side view of the optical head shown in FIG. 1.
Figure 3:
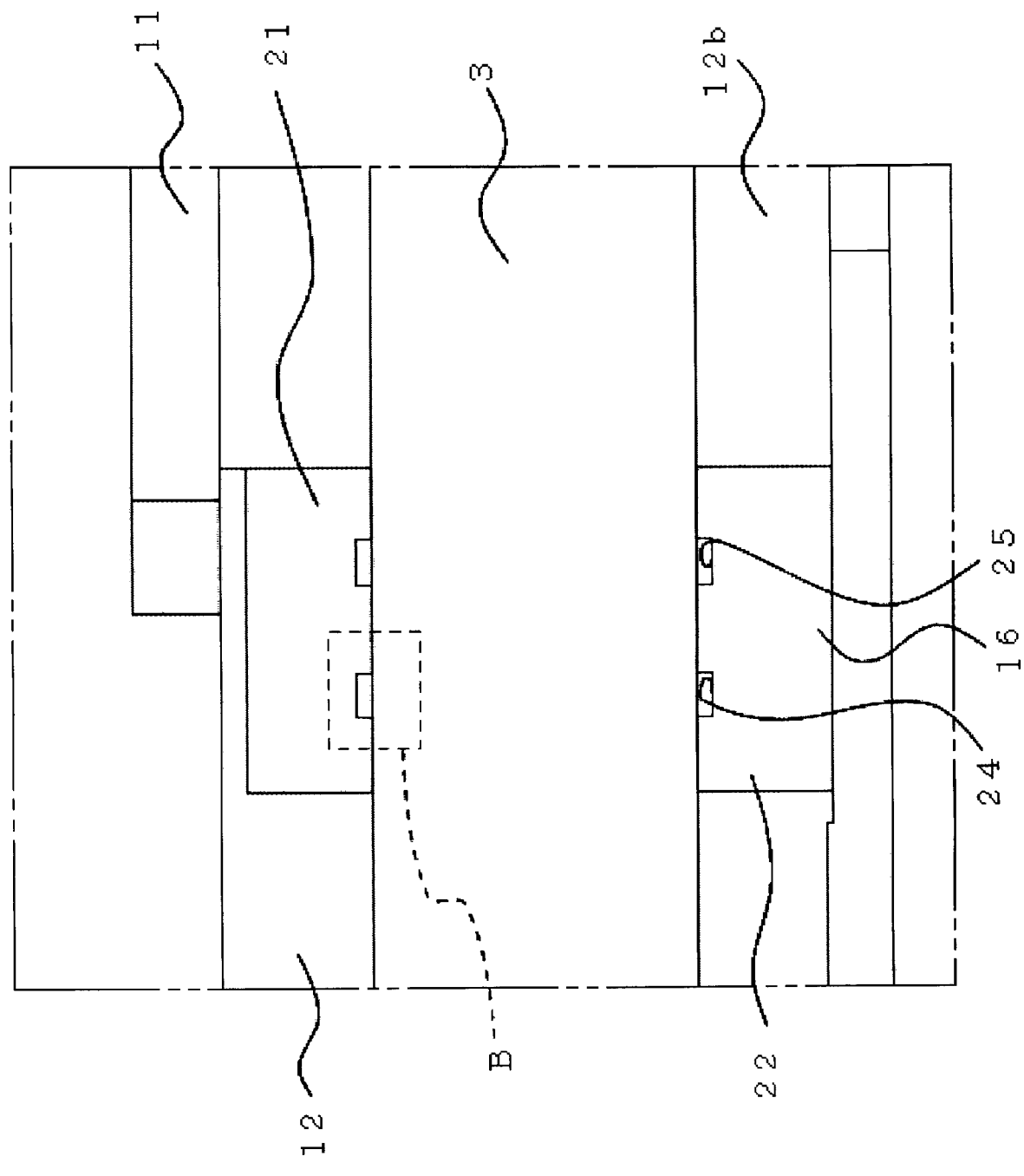
FIG. 3 is an enlarged drawing of the portion of A shown in FIG. 2.
Figure 4:
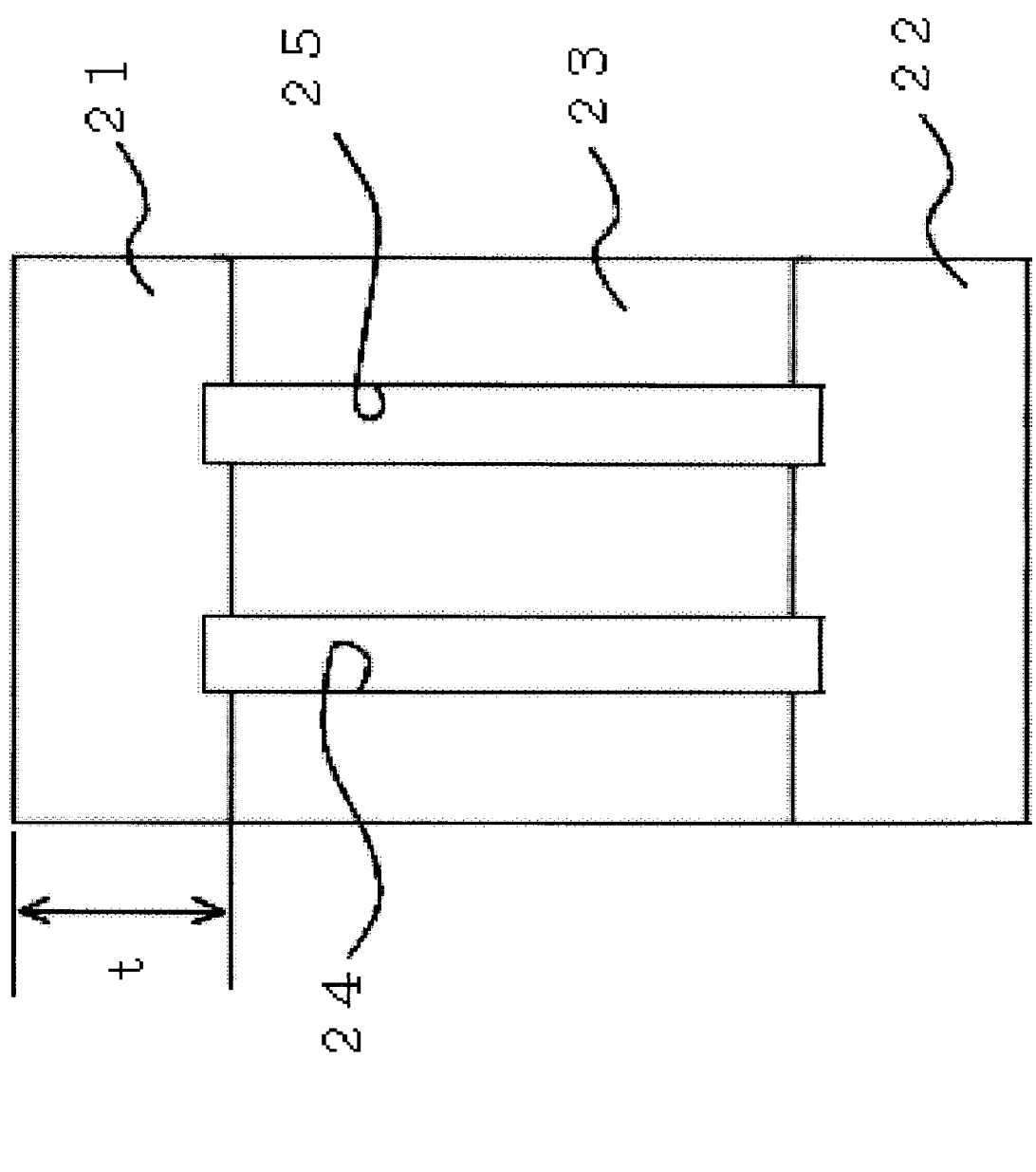
FIG. 4 is a right side view of the sub-bearing shown in FIG. 3.

FIG. 1 is an outline perspective view showing the state where main-shaft 2 and sub-shaft 3 were inserted in main-bearings 14 and 15 and sub-bearing 16 of optical head 1 concerning embodiment of the invention 1. The enlarged drawing of the portion of A which shows the right side view of optical head 1 which shows FIG. 2 in FIG. 1, and FIG. 3 in FIG. 2, and FIG. 4 are right side views of sub-bearing 16 shown in FIG. 3.

This optical head 1 comprises objective lens driving device 11 and housing 12.

Objective lens driving device 11 drives objective lens 13 in a focus direction and a tracking direction and also a radial direction, or the tangential direction. Housing 12 is formed by the shell mold by die-casting fabrication or powder metallurgy or cutting from a suitable block, forging, knockout fabrication, etc. with various metal, such as zinc (Zn), aluminum (aluminum), and magnesium (Mg), or these alloys, for example. The oxide film is formed in the surface when die-casting fabrication of the housing 12 is carried out with zinc (Zn), aluminum (aluminum), and magnesium (Mg).

This oxide film has high hardness compared with zinc (Zn), aluminum (aluminum), and magnesium (Mg). That is, compared with internal hardness, the surface hardness of housing 12 which carried out die-casting fabrication with zinc (Zn), aluminum (aluminum), and magnesium (Mg) is high.

As a zinc alloy, there are a Zn—Cu—Ti-aluminum system, a Zn-nickel-Ti-aluminum system, a Zn—Mn—Ti-aluminum system, a Zn—Mn-aluminum system, a Zn—Mn—Cu—Ti system, a Zn—Mn-nickel-Ti system, a Zn-nickel-Ti-aluminum system, a Zn—Cu-aluminum system, etc.

As an aluminum alloy, there are a pure aluminum system, an aluminum-Cu system, an aluminum-Mn system, an aluminum-Si system, an aluminum-Mg system, an aluminum-Mg—Si system, an aluminum-Zn—Mg system, etc.

As a Magnesium alloy, there are a Mg-aluminum-(Zn)—(Mn) system, a Mg—Zn—Zr system, a Mg-rare earth element system, etc., for example.

Although not illustrated in housing 12, the penetrated part which is the outer periphery shape and the formed similar figure of the above-mentioned objective lens driving device 11 is formed.

The above-mentioned objective lens driving device 11 fits loosely into this penetrated part. Objective lens driving device 11 is in the state which fitted loosely into the penetrated part of housing 12, and is being fixed by adhesives etc. in housing 12 in several each of the upper edge part of a penetrated part, and a lower edge part. Thereby, housing 12 supports the above-mentioned objective lens driving device 11.

Although not illustrated, the optical system which consists of a beam splitter, a collimate lens, etc. is provided in the core of housing 12. This optical system changes the optical path of the light beam emitted from a laser diode, and is made to emit it from objective lens 13, and this light beam is completed as the acceptance surface of the photodetector which consists of photo-diodes etc.

Main-bearings 14 and 15 which assumed section approximate circle shape set a prescribed interval in side 12a of housing 12, and are formed in it united with the main part of housing 12. Sub-bearing 16 whose section is U type-like is formed in side 12b of housing 12 united with housing 12.

As shown in FIG. 1, main-shaft 2 moves optical head 1 along the radial direction (tracking direction) of an optical disc (not shown). This main-shaft 2 is cylinder shape, and is inserted in main-bearings 14 and 15.

Sub-shaft 3 is guided along a plane parallel to the data logging side of an optical disc (not shown), in order to ensure movement of optical head 1. This sub-shaft 3 is cylinder shape, and is inserted in sub-bearing 16.

After grinding metal round bars, such as stainless steel, hardening processing, mirror finish processing of the peripheral surface, etc. are performed to main-shaft 2 and sub-shaft 3, for example. Therefore, main-shaft 2 and sub-shaft 3 are precise things without distortion. This is for optical head 1 to slide by seek operation on the basis of main-shaft 2 and sub-shaft 3.

Sub-bearing 16 regulates that housing 12 rocks around main-shaft 2 with movement.

For this reason, sub-bearing 16 is formed in the position distant from side 12a in which main-bearings 14 and 15 by which main-shaft 2 is inserted in in the same field parallel to the optical disc of housing 12 were formed. That is, sub-bearing 16 is formed in side 12b of the opposite side on both sides of objective lens 13 which constitutes objective lens driving device 11 of housing 12.

The 1st leg 21 and the 2nd leg 22 constitute an open end. Sub-bearing 16 is pinching the top side and bottom side of sub-shaft 3 from both directions between this open end. From the end undersurface of the 1st leg 21 to the end upper surface of the 2nd leg 22 through the surface of connection 23 which connects the 1st leg 21 and the 2nd leg 22, U character-like slots 24 and 25 separate a prescribed interval, and the section is formed.

The depth of slots 24 and 25 is 0.2 mm, and width is 0.4 mm, for example. In this example, slots 24 and 25 are formed considering the direction almost perpendicular to the central axis of sub-shaft 3 as that longitudinal direction.

The undersurface of the 1st leg 21 in which it is located up in FIGS. 1-4 is always in slide contact with the top side of sub-shaft 3. In order to make the undersurface of the 1st leg 21 always in slide contact to the top side of sub-shaft 3, the spring mechanism in which proper contact pressure is made to act to the 1st leg 21 may be established.

On the other hand, a minute interval may be provided between the upper surface of the 2nd leg 22 and the bottom side of sub-shaft 3 in which it is located below in FIGS. 1-4. By providing this minute interval, movement of smooth and housing 12 of low resistance can be aimed at. As a result, optical record playback equipment which carries this optical head 1 can be made into low noise and a long-life life.

Next, sliding operation of optical head 1 of the above-mentioned composition is explained.

First, grease is applied to each side of main-shaft 2 and sub-shaft 3 in order to reduce the sliding resistance at the time of optical head 1 sliding. That is, after applying grease to each side of main-shaft 2 and sub-shaft 3, while inserting main-shaft 2 in main-bearings 14 and 15 to which grease was applied, sub-shaft 3 is inserted in sub-bearing 16.

Then, optical head 1 is slid several times. Thereby, grease spreads on each side of main-shaft 2 and sub-shaft 3, each inside of main-bearings 14 and 15, the undersurface of the 1st leg 21 that constitutes sub-bearing 16, the upper surface of the 2nd leg 22, and the surface of connection 23.

Figure 5:
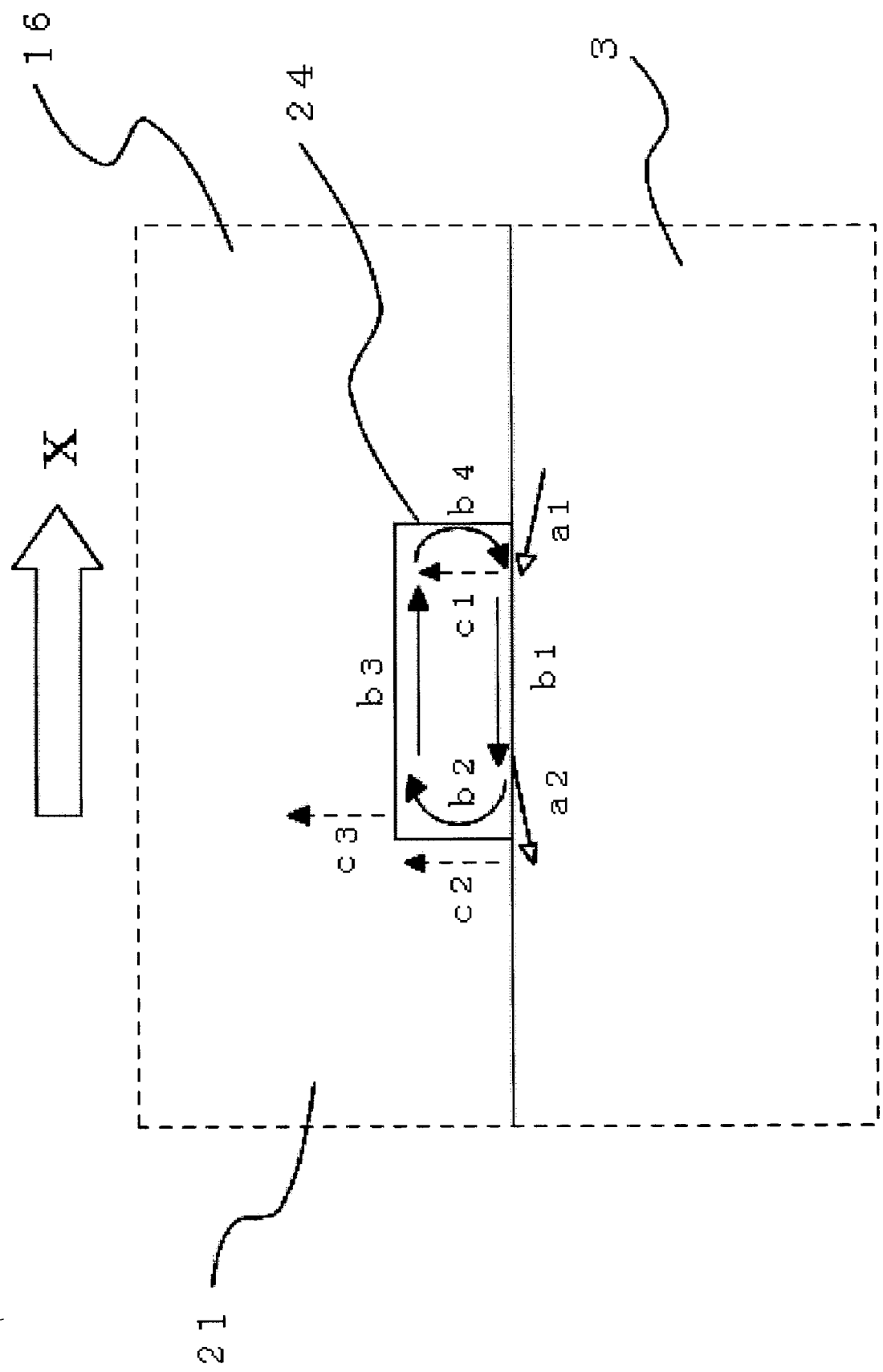
FIG. 5 is a key map for explaining the situation where grease flows in near the slot formed in the sub-bearing shown in FIG. 3 (portion of B).

Slots 24 and 25 formed in sub-bearing 16 are also filled up with grease. FIG. 5 is a key map for explaining signs that grease flows in the slot 24 neighborhood (portion of B) formed in sub-bearing 16 shown in FIG. 3. Here, it is assumed that the core of slot 24 is full of grease. If optical head 1 moves to the x direction shown in FIG. 5, the grease applied to the side of sub-shaft 3 will move to the core of slot 24, as a head shows in FIG. 5 by white arrow a1 ("white arrow" is called hereafter.).

Next, the grease which moved to the core of slot 24 circulates through the core of slot 24 in the clockwise direction among a figure in FIG. 5, as arrow with a black head b1-b4 ("black arrow" is called hereafter.) show. Thereby, inside slot 24, as a pedicel shows in FIG. 5 by arrow c1 and c2 of a dashed line ("dashed line arrow" is called hereafter), surfacing power occurs, and as dashed line arrow c3 shows to FIG. 5, surfacing power occurs in the exterior of slot 24.

The frictional resistance produced between the undersurface of sub-shaft 3 and the 1st leg 21 that constitutes sub-bearing 16, the surface of connection 23, and the upper surface of the 2nd leg 22 decreases by the behavior of the grease explained above.

Therefore, the wear in the side of sub-bearing 16 decreases.

Here, an example of change of the thickness of sub-bearing 16 before and after the sliding test of an example and a comparative example is shown in FIG. 6.

A sliding test makes one round trip 1 time for sliding operation from one end of main-shaft 2 and sub-shaft 3 to the other end, and repeats optical head 1 2 million times. The thickness of sub-bearing 16 means the distance (thickness t shown in FIG. 4) from the upper surface of sub-shaft 3 to the upper surface of sub-bearing 16. The maximum permissible dose of wear shall be 40 micrometers (0.04 mm), for example. This is decided by the coil for tilt (not shown) which constitutes the mounting accuracy of optical head 1, main-shaft 2, and sub-shaft 3, the accuracy of dimension of the component parts of optical head 1, and objective lens driving device 11 and the adjustable range of a skew adjustment circuit (for example, refer to FIG. 7), the error rate of the reproduced data, etc.

As shown in FIG. 6, each amount of wear in comparative examples 1-3 (COEX. 1-3) is over 40 micrometers which is the maximum permissible dose sharply. On the other hand, each amount of wear in Examples 1-3 (EX. 1-3) is 40 micrometers or less which is the maximum permissible dose, and can fully be equal to practical use.

Thus, according to the embodiment 1, from the end undersurface of the 1st leg 21 to the end upper surface of the 2nd leg 22 through the surface of connection 23, U character-like slots 24 and 25 separate a prescribed interval, and the section is formed in sub-bearing 16 formed in housing 12 at one. Therefore, even if optical head 1 repeats seek operation millions times, the amount of wear of countershaft carrier 16 is sharply reducible compared with the former.

According to embodiment of the invention 1, housing 12 and sub-bearing 16 are united, and are formed, and are not allocating any another member in sub-bearing 16, either.

Therefore, as compared with the 2nd above-mentioned conventional example, the number of parts and the number of manufacturing processes can be reduced, and an optical head can be constituted cheaply.

There is no possibility of 16 sub-bearing of separating from housing 12, at the time of operation of an optical head.

Moreover, since the optical head is cheap while the miniaturization of optical record playback equipment is easily realizable, optical record playback equipment can also be constituted cheaply.

When housing 12 is especially formed with magnesium (Mg) according to embodiment of the invention 1, while high-speed seek operation of optical head 1 is possible, the weight saving of optical head 1 can be attained, and it can produce cheaply.

Hereafter, the reason is explained.

Among the metallic materials used for housing, it is difficult for it to attain the weight saving of optical head 1 while being unable to perform high-speed seek operation in housing 12 which consists of zinc (Zn), since zinc (Zn) has high density (7.1). When die-casting fabrication of the housing 12 is carried out with aluminum, it is easy to react with the iron which constitutes the die used for fabrication, and the contraction percentage after fabrication is high.

For this reason, when fabricating housing 12, while using a cold chamber, after fabricating beforehand more greatly than specified shape, post-processing of cutting etc. is required.

For this reason, there is a possibility that housing 12 may become expensive and optical head 1 may become expensive.

On the other hand, in magnesium (Mg), the density is low (1.8) and the cold chamber at the time of fabrication and post-processing after fabrication are unnecessary. Therefore, the weight saving of optical head 1 can be attained, and housing which consists of magnesium (Mg) can be cheaply produced while high-speed seek operation is possible.

Embodiment 2

Figure 7:
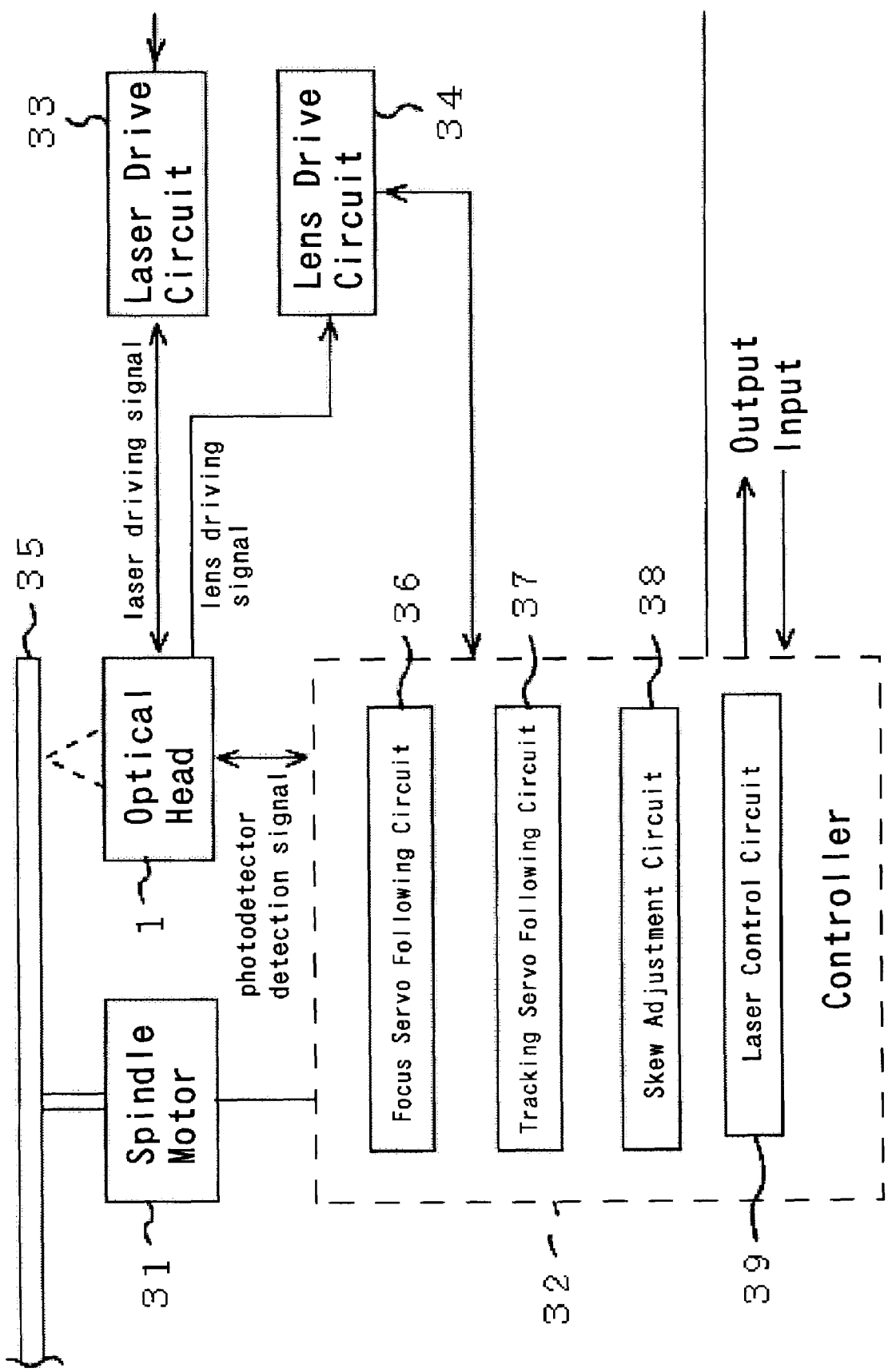
FIG. 7 is a schematic diagram showing the composition of the optical record playback equipment concerning embodiment of the invention 2.

FIG. 7 is a schematic view showing the composition of the optical record playback equipment concerning the form 2 of implementation of the present invention. This optical record playback equipment consists of an optical head 1 concerning the above-mentioned form 1 of enforcement, a spindle motor 31, a controller 32, a laser drive circuit 33, and a lens drive circuit 34.

Spindle motor 31 rotates optical disc 35 under control of controller 32. Controller 32 controls spindle motor 31, laser drive circuit 33, and lens drive circuit 34 based on the photodetector detection signal supplied from optical head 1.

Laser drive circuit 33 generates the laser driving signal for driving the laser diode which is a light source (not shown) which constitutes optical head 1 under control of controller 32, and supplies it to optical head 1.

Lens drive circuit 34 generates the lens driving signal for controlling focusing, the tracking, and the skew of objective lens 13 (refer to FIG. 1) which constitutes optical head 1 under control of controller 32, and supplies it to optical head 1.

Controller 32 has focus servo following circuit 36, tracking servo following circuit 37, skew adjustment circuit 38, and laser control circuit 39. Focus servo following circuit 36 generates a focus servo signal based on the photodetector detection signal supplied from optical head 1. This focus servo signal is used in order to apply the focus of the light beam emitted to the data logging side of revolving optical disc 35 from optical head 1. Focus servo following circuit 36 supplies this focus servo signal to lens drive circuit 34.

Tracking servo following circuit 37 generates a tracking servo signal based on the photodetector detection signal supplied from optical head 1. This tracking servo signal is used in order to make the beam spot of the light beam emitted from optical head 1 follow to the signal truck which is carrying out eccentricity of the optical disc 35. Tracking servo following circuit 37 supplies this tracking servo signal to lens drive circuit 34.

Skew adjustment circuit 38 generates a skew adjustment signal based on the photodetector detection signal supplied from optical head 1. This skew adjustment signal is used in order to make objective lens 13 (refer to FIG. 1) which constitutes optical head 1 incline in a radial direction or the tangential direction. Skew adjustment circuit 38 supplies this skew adjustment signal to lens drive circuit 34.

Laser control circuit 38 generates a suitable laser driving signal based on the record condition setting information currently recorded on optical disc 35 extracted from the photodetector detection signal supplied from optical head 1.

Thus, according to the 2nd embodiment of the present invention, optical record playback equipment is constituted using the optical head 1 concerning the above-mentioned form 1 of enforcement.

Therefore, optical record playback equipment can be cheaply constituted while being able to miniaturize easily.

Embodiment 3

Although the optical head in which one light source is prepared, and the optical head showed the example of optical record playback equipment established one piece with the forms 1 and 2 of above-mentioned enforcement, it is not limited to this. Also in the optical record playback equipment which has two or more optical heads which have two or more light sources, and optical heads, the present invention is applicable.

Such an optical head and optical record playback equipment are indicated by Japanese Patent No. 2004-295982, for example.

As mentioned above, although the embodiment of the invention has been explained in full detail with reference to a drawing, concrete composition is not restricted to these embodiments.

It is contained in this invention even if there is change of a design of the range which does not deviate from the gist of this invention etc.

For example, although the section showed the example which forms U character-like two slots 24 and 25 to sub-bearing 16 by the above-mentioned embodiment 1, the section shape or the number of a slot are not limited to this. As long as it is the structure of a slot where grease enters easily, and it is hard to come out, grease moreover moves to a core at the time of seek operation of optical head 1, and surfacing power is produced, what kind of thing may be used.

In the above-mentioned embodiment 1, from the end undersurface of the 1st leg 21 to the end upper surface of the 2nd leg 22 through the surface of connection 23, U character-like slots 24 and 25 separate a prescribed interval, and the section is formed in sub-bearing 16 formed united with housing 12.

However, it is not limited to this. What is necessary is to be in slide contact on the side of a sub-shaft 3 and just to form a slot in the part used as the standard for holding the level of the optical head 1 to an optical disc.

In the above-mentioned embodiment 1, reference is not made especially about processing on the surface of housing 12.

However, you may perform processing which forms the oxide film on housing 12, especially on the surface of the sub-bearing 16 which is in slide contact on the side of a sub-shaft 3. Thereby, surface hardness is raised.

What is claimed is:

1. An optical head comprising:
   a housing that supports an objective lens driving device that drives an objective lens;
   a main-shaft and sub-shaft that support the housing such that the housing slides along a radial direction of an optical recording medium along the main-shaft and the sub-shaft;
   a main-bearing formed on the housing that supports the main-shaft so that the main-shaft can slide free through the main-bearing;
   a sub-bearing formed on the housing that supports the sub-shaft so that the sub-shaft can slide free through the sub-bearing; and
   at least one slot formed in the sub-bearing at a portion that contacts the sub-shaft.

2. The optical head according to claim 1, wherein the slot is formed along a direction substantially perpendicular to the sub-shaft.

3. The optical head according to claim 2, wherein the housing includes a metal main part, and the main-bearing and the sub-bearing are formed united with the main part.

4. The optical head according to claim 3, wherein the metal is magnesium or a magnesium alloy.

5. The optical head according to claim 1, wherein the housing includes a metal main part, and the main-bearing and the sub-bearing are formed united with the main part.

6. The optical head according to claim 5, wherein the metal is magnesium or a magnesium alloy.

7. An optical record playback equipment comprising: the optical head according to claim 1.

8. The optical head according to claim 7, wherein the slot is formed along a direction substantially perpendicular to the sub-shaft.

9. The optical head according to claim 8, wherein the housing includes a metal main part, and the main-bearing and the sub-bearing are formed united with the main part.

10. The optical head according to claim 9, wherein the metal is magnesium or a magnesium alloy.

11. The optical head according to claim 7, wherein the housing includes a metal main part, and the main-bearing and the sub-bearing are formed united with the main part.

12. The optical head according to claim 11, wherein the metal is magnesium or a magnesium alloy.

* * * * *